(12) United States Patent
Paredes et al.

(10) Patent No.: US 6,640,293 B1
(45) Date of Patent: Oct. 28, 2003

(54) APPARATUS AND METHOD OF UTILIZING ALIAS HIT SIGNALS TO DETECT ERRORS WITHIN THE REAL ADDRESS TAG ARRAYS

(75) Inventors: Jose Angel Paredes, Austin, TX (US); Bruce Joseph Ronchetti, Austin, TX (US); Binta Minesh Patel, Round Rock, TX (US); George McNeil Lattimore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 09/624,105

(22) Filed: Jul. 24, 2000

(51) Int. Cl.[7] ............................................. G06F 12/00
(52) U.S. Cl. ........................ 711/210; 711/200; 712/217
(58) Field of Search ................................. 712/216, 217, 712/220; 711/200, 202, 203, 210

(56) References Cited

U.S. PATENT DOCUMENTS

| | | | | |
|---|---|---|---|---|
| 5,168,560 A | * | 12/1992 | Robison et al. | ............. 711/133 |
| 5,499,204 A | * | 3/1996 | Barrera et al. | ................. 365/49 |
| 5,640,534 A | * | 6/1997 | Liu et al. | ..................... 711/146 |
| 5,668,972 A | * | 9/1997 | Liu et al. | ..................... 711/136 |
| 5,805,855 A | * | 9/1998 | Liu et al. | ..................... 711/108 |
| 5,887,152 A | * | 3/1999 | Tran | ........................... 712/217 |
| 5,890,221 A | * | 3/1999 | Liu et al. | ..................... 711/210 |
| 6,021,485 A | * | 2/2000 | Feiste et al. | ................. 712/216 |
| 6,202,128 B1 | * | 3/2001 | Chan et al. | .................. 711/131 |
| 6,266,768 B1 | * | 7/2001 | Frederick, Jr. et al. | ...... 712/220 |

* cited by examiner

Primary Examiner—Tuan V. Thai
(74) Attorney, Agent, or Firm—Kelly K. Kordik; Winstead Sechrest & Minick P.C.; Mark E. McBurney (57) ABSTRACT

A data processing system including a processor having a load/store unit and method for utilizing alias hit signals to detect errors within the read address tag arrays.

Within a load store unit, implemented within a processor, a real address tag array is utilized to indicate when effective address aliasing occurs in a primary cache array. If aliasing occurs, Alias Hit signals are then used to clear any aliased entries. These Alias Hit signals can also be utilized to determine if there has been some type of failure within the real address tag array.

15 Claims, 6 Drawing Sheets

SET A

SET B

FIG. 5

APPARATUS AND METHOD OF UTILIZING ALIAS HIT SIGNALS TO DETECT ERRORS WITHIN THE REAL ADDRESS TAG ARRAYS

CROSS REFERENCE TO RELATED APPLICATION

The present invention is related to the following patent applications:

U.S. patent application Ser. No. 09/435,862, entitled "Real Address Tag Array"; now U.S. Pat. No. 6,477,635.

U.S. patent application Ser. No. 09/263,665, entitled "System and Method for Store Forwarding"; now U.S. Pat. No. 6,349,382.

U.S. patent application Ser. No. 09/213,331, entitled "System and Method for Permitting Out-of-Order Execution of Load and Store Instructions"; now U.S. Pat. No. 6,301,654.

U.S. patent application Ser. No. 09/259,140, entitled "System and Method for Executing Store Instructions", now U.S. Pat. No. 6,336,183 and U.S. patent application Ser. No. 09/259,139, entitled "System and Method for Merging Multiple Outstanding Load Miss Instructions," now U.S. Pat. No. 6,336,168 which are all hereby incorporated by reference herein.

TECHNICAL FIELD

The present invention relates in general to data processing systems, and in particular, to the execution of load and store instructions in a processor.

BACKGROUND INFORMATION

Aliasing occurs when a Real Address (RA) may be mapped to multiple Effective Addresses (EA). This is the case in certain architectures where bits 50 and 51 of the EA always translate to bits 50 and 51 of the RA. Therefore, there might be four EAs that can map to the same RA.

Because it is an error in such architecture to store more than one cache line at two different EAs which map to the same RA, the herein disclosed structure of the Real Address Tag addresses the problem by invalidating the previously stored cache line to make room for the next line at the new EA. Bits 50 and 51 of the EA are used to select between 4 sub-arrays (for each set) in the RA Tag which contain the RA the current EA maps into. During a cycle in which a new EA is mapped to a RA (through the ERAT or some other Effective to Real address translation mechanism), the RA Tag looks up the new RA and compares it with the RAs already stored in its 4 sub-arrays. If a match occurs, then a different EA already maps to the RA and the cache line at the old EA location must be invalidated. This is known as an Alias Hit.

In order to invalidate the cache line, the RA Tag sends a "1 hot" signal to other logic blocks (Cache, Tag, ERAT, etc.) specifying which EA the Alias Hit was detected for. Since bits 50 and 51 of the EA were used for storing the RA, the RA Tag simply needs to send a 4-bit field to the other logic blocks to inform them which line to clear. For example, if sub-array 0 hits then bits 50 and 51 of the EA must have been 00, and the 4 bit field is 0001, if sub-array 1 hits then bits 50 and 51 of the EA must have been 01 and the 4 bit field is 0010, etc.

Encoding the bits in this way (known as 2B encoding) makes it easier for the other logic blocks to decode the location and thus improve access time. The arrays simply need to perform logical ANDing of bits for the number of address bits minus 1. For instance, if the address is 2 bits wide, the encoding would be 0001, 0010, 0100, 1000. The active bits would map directly to the wordline addresses. If the address is 3 bits wide then the encoding would be 00010001, 00010010, 00010100, etc. And only a 2 input logical AND is necessary to map to the correct wordline. When all bits are '0' then no wordlines are being selected.

If a failure occurs within the RA Tag or in some other logic block which controls it, there might be a case in which more than one Alias Hit is detected. This should be flagged as a failure, since the job of the RA Tag is to avoid multiple Aliasing altogether. Therefore, there is a need for a solution for detecting such failures.

SUMMARY OF THE INVENTION

The present invention addresses the foregoing need by utilizing the Alias Hit signals to detect errors within the RA tag arrays. More specifically, an error is reported if more than one Alias Hit signal is received from a set of RA tag arrays, or if more than one Alias Hit signal is received from more than one set of RA tag arrays.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
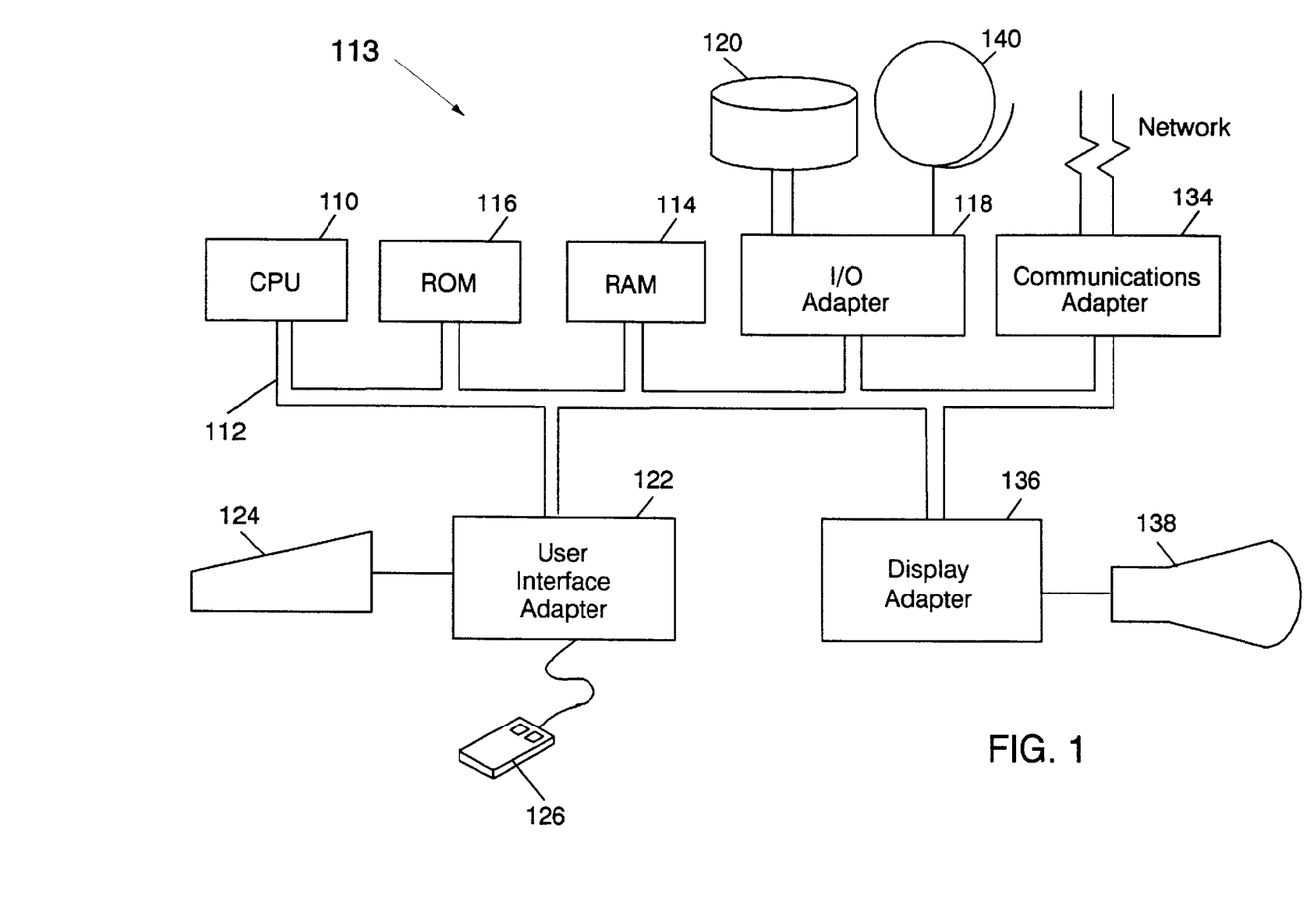
FIG. 1 illustrates a data processing system configured in accordance with the present invention.

A representative hardware environment for practicing the present invention is depicted in FIG. 1, which illustrates a typical hardware configuration on of workstation 113 in accordance with the subject invention having central processing unit (CPU) 110, and a member of other units interconnected via system bus 112. CPU 110 embodies the load/store unit 201 of the present invention as described below. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as, a touch screen device (not shown) to bus 112, communications adapter 134 for connecting workstation 113 to a data processing network, and display adapter 136 for connecting bus 112 to display device 128. CPU 110 may include other circuitry (other than load/store unit 201) not shown herein, which will include circuitry commonly found within a microprocessor, e.g., execution unit, bus interface unit, arithmetic logic unit, etc. CPU 110 may also reside on a single integrated circuit.

Figures 2, 2A:
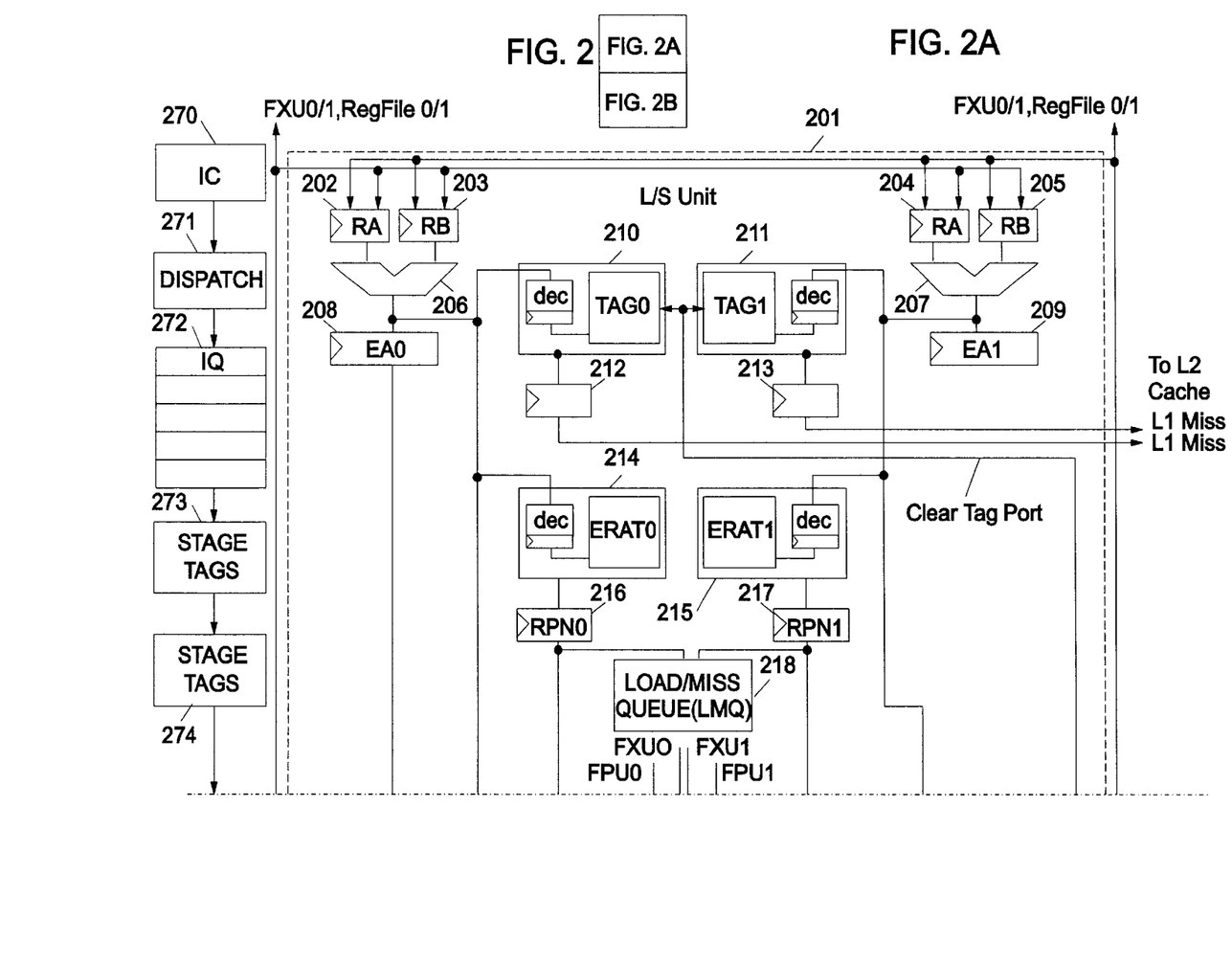
FIG. 2, FIGS. 2A and 2B together, illustrate a load/store unit configured in accordance with the present invention.
Figure 2B:
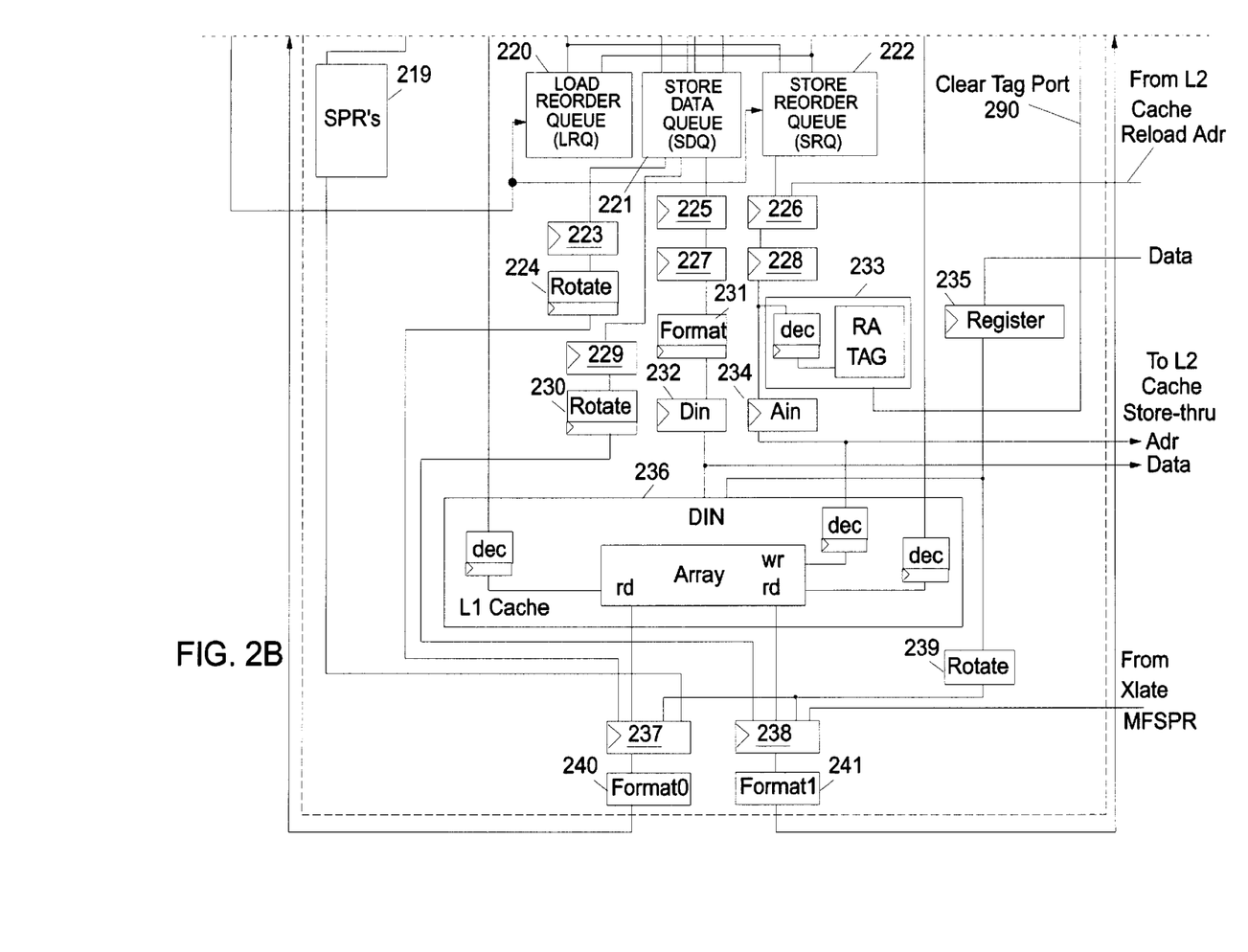

FIG. 2, FIGS. 2A and 2B together illustrates load/store (L/S) unit 201 configured in accordance with the present invention. L/S unit 201 is located within CPU 110, which may be configured in accordance with typical microprocessor architectures.

L/S unit 201 has two pipelines so that two load or store instructions can be issued per machine cycle. Registers 202–205 receive instructions from fixed point units (FXUs) 0 and 1 (not shown) in a manner well-known in the art 64-bit adder 206 adds operands received from registers 202 and 203, while 64-bit adder 207 adds operands from registers 204 and 205 to produces a pair of 64-bit effective addresses (EAs). These effective addresses are outputted to registers 208 and 209, respectively. Registers 208 and 209 capture the effective addresses (EA). They then both feed LMQ (load miss queue) 218, LRQ (load reorder queue) 220 and SRQ (store reorder queue) 222, which all need a portion of the EA in addition to the real address from registers 216 and 217 to perform address checking. Additionally, the effective addresses are decoded to access tag arrays 210 and 211 to determine if there is a hit or a miss within L1 cache 236 (FIG. 2B). If there is a miss, then the addresses are passed through registers 212 and 213 and sent to the L2 cache (not shown).

Furthermore, the effective addresses are sent from adders 206 and 207 to be decoded and to access the effective real address translator (ERAT) arrays 214 and 215, respectively, which output translated addresses through registers 216 and 217.

Further, the effective addresses from adders 206 and 207 access the L1 cache 236 for the load operation after being decoded by the decoders within the L1 cache 236. If there is a hit in the L1 cache 236, then the data is read out of the L1 cache 236 into registers 237, 238, and formatted by formatters 240, 241, and returned on the result bus to be sent to a register file (RegFile) (not shown). The cache line read out of L1 cache 236 is also returned into the registers 202–205 for operations that are dependent on the result as an operand.

Essentially, the three cycles performed within L/S unit 201 are the execute cycle (where the addition is performed), the access cycle (where access to the arrays is performed), and the result cycle (where the formatting and forwarding of data is performed).

If there is a miss in the cache, the request is then sent down to the L2 cache (not shown). The load miss queue (LMQ) 218 waits for the load data to come back from the L2 cache (not shown). The data associated with that cache line is loaded into the L1 cache 236.

These load operations can be performed speculatively and out of order. Store instructions are also executed out of order. Store instructions are divided into store address and store data instructions. The individual instructions are executed as soon as their operands are available and an execution unit is available to execute them. Store address instructions are translated and put in the store reorder queue (SRQ) 222. Store data instructions read the FXU (fixed point unit) or FPU (floating point unit) register file and send the result to be written in the store data queue (SDQ) 221 to wait their turn to write to the L1 cache 236. Therefore, store instructions are executed out of order, but written into the L1 cache 236 in order.

The SRQ 222 keeps track of store instructions that have been executed. SRQ 222 maintains the store instructions in the queue and determines when the data is available in the SDQ 221 and when the store instruction is next to complete. The store to the L1 cache 236 is then completed.

Many of the registers 223, 225–229, and 237–238, are utilized for timing.

Cache lines within the L1 cache 236 are accessed based on the effective address of the cache line. The RA tag array 233 keeps track of where in the L1 cache 236 a cache line was written. The format block 231 takes the data from the SDQ 221 and rotates it properly to write into the correct byte positions in the L1 cache 236 upon execution of the store instruction.

Rotate blocks 224 and 230 are utilized for store forwarding. Therefore, if there is a store instruction that is sitting in the store queue and has not been written into the cache/memory subsystem yet because it is not next to complete, and then a younger load instruction is received that needs that data, the data will be forwarded to the load instruction being executed (see FIG. 4). To simplify store forwarding, and store writes, when data is transferred to the SDQ 221, the data is rearranged so that the data corresponding to the location in memory of the store address is written into the first byte of the SDQ 221 entry, the store address +1 into the second byte, etc. The data is arranged in the order written to memory, but is byte-aligned. When the data is written to the L1 cache 236, it is rotated (blocks 224 and 230) so that the data is double-word aligned.

Rotate block 239 is utilized to rotate data received from the L2 cache (not shown) in response to an L1 cache miss, for forwarding the data from the L2 cache on to the result bus for forwarding to the proper register file.

Block 219 contains a number of special purpose registers to store data as a result of special purpose register instructions and read data from these registers so they get into the normal pipeline.

Register 235 is implemented for timing purposes to stage data from the L2 cache (not shown). Format blocks 240 and 241 format (or shift) cache data into the proper byte positions for the load result to the register file.

In one embodiment of the present invention, an effective address comprising 64 bits and is corresponding 64-bit real address may only have the four kilobyte page offset address bits 52:63 as equal. The cache address may comprise bits 50:63, while the cache RA tag address will be comprised of bits 22:51 of the real address. Cache aliasing is created when the effective address is used to address the cache and bits 50:51 of the effective address do not match RA bits 50:51. When only the RA is known, it may exist in one of four locations in the cache. The RA tag algorithms (FIGS. 3–5) of the present invention solves the conversion from RA to EA to allow correct addressing of an EA addressed cache or array. The RA tag is used to perform real address stores, snoop invalidates, and cache reloads.

Figure 3:
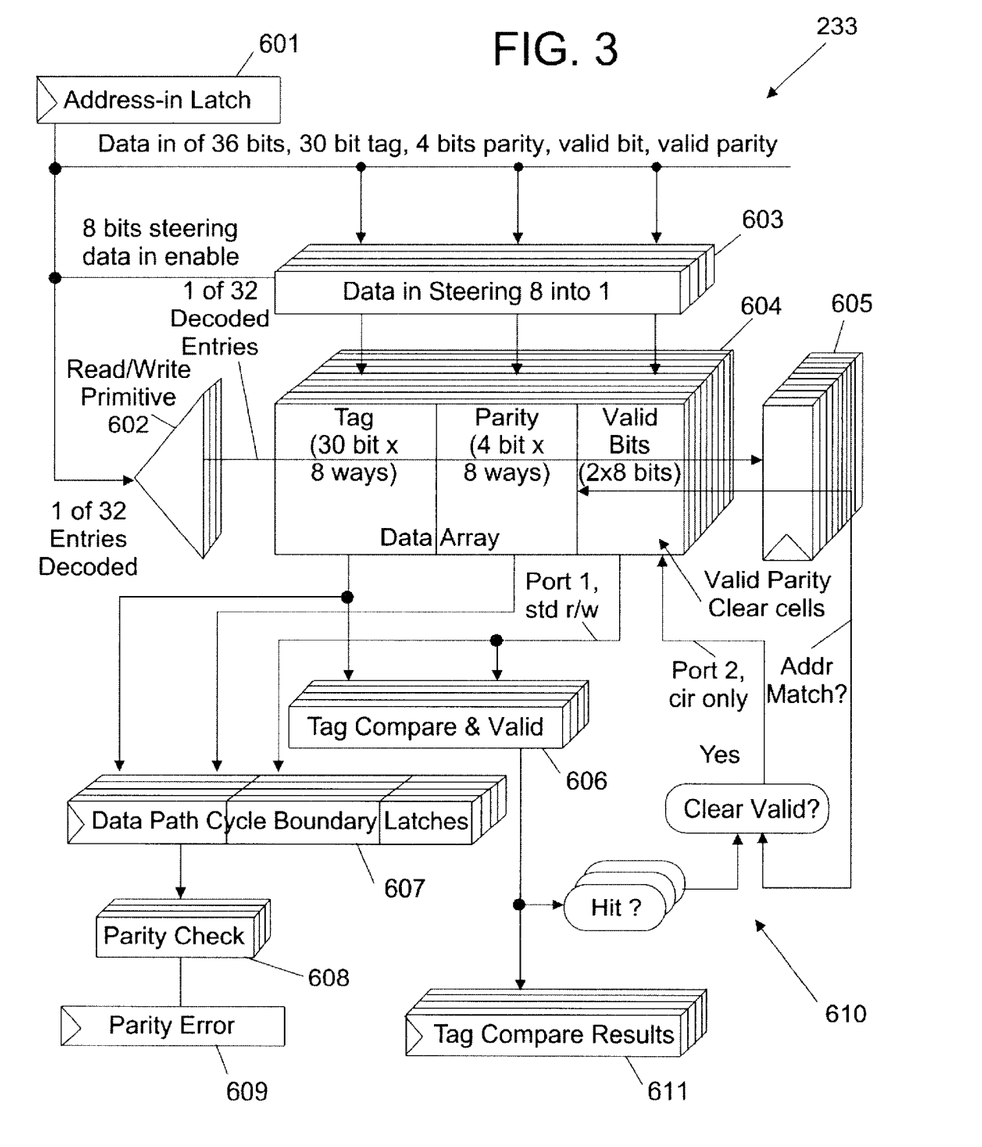
FIG. 3 illustrates further detail of a real address tag array in accordance with the present invention.

Referring next to FIG. 3, there is illustrated further detail of RA tag 233. In one implementation of RA tag 233, there are included eight sub-RAMs (also referred to as data array or tag array) 604 with 32 entries in each. There are 30 bits of tag, plus 4 bits of parity, one valid bit and one valid parity bit. An address will be received into latch 601 where it is then broken up to be decoded in decoder 602 and the data goes into array 603. The outputs of decoder 602 and array 603 am received into the data array 604. The decoded portion gets saved in latches 605 so that they can be used for clearing if the result of the tag compare in tag compare and valid block 606 is positive. The comparison data is saved within register 611. If the compare is positive, there is a hit. A clear valid signal is generated when there is a proper hit in the RA tag 233. This can occur as a result of a snoop hit to the RA tag 233 or a reload instance to aliased lines. This is produced by tag compare and valid block 606. Register 605 holds the address of the line that could create a clear valid signal. These are used to index an array if a clear valid signal is asserted for the RA_tag array 604 The clear valid signal and associated address are also sent to the tag arrays 210 and 211 (FIG. 2A). These addresses are pipelined through staging latches 212 and 213 (FIG. 2A). Additionally simultaneously, the data is stored in cycle boundary latches 607 in order to compute a parity check in block 608 and report any parity error in block 609.

Within the RA tag 233, only a one-to-one mapping is allowed between an effective address and a real address. However, the architecture permits four effective addresses to map to one real address. Therefore, for example, if a store operation is performed to a particular effective address, and then a load operation also is performed to that same effective address, the system needs to be sure that the proper data is loaded. Essentially what the present invention does is to undo the map of the first effective address to the real address when a new effective address is processed, and then a map is plotted between the new effective address and the real address so that at any given time there is only one mapping of an effective address to a real address.

In a 64-bit address, the effective address comprises bits 50:63, while the RA tag 233 uses bits 22:51. As a result, bits 50 and 51 overlap, which results in the aliasing problem. Therefore, if an effective address is used to access array 604 within RA tag 233, there are four possible matches.

Within the RA tag 233, a real address will be received and decoded and compared to other real addresses within array 604. When a match, or hit, occurs, bits 50 and 51 associated with the address found in array 604 are calculated. Each of the four comparators 606 correspond to the four values represented by bits 50:51. The first comparator represents value '00'b. The second represents value '01'b, the third '10'b, and the fourth '11'b. The comparator 606 that matches identifies the effective address of bits 50:51. This is how the EA address is calculated for steps 306, 406, and 506 described below with respect to FIGS. 3–5, respectively. These bits 50:51 are used to address the tag arrays 210 and 211 (FIG. 2A).

A snoop address is presented as a real address to the RA tag 233. After the EA address is calculated with the comparator 606, an EA address with bits 50:51 can be used to address the tag arrays 210 and 211. (FIG. 2A).

Figure 4:
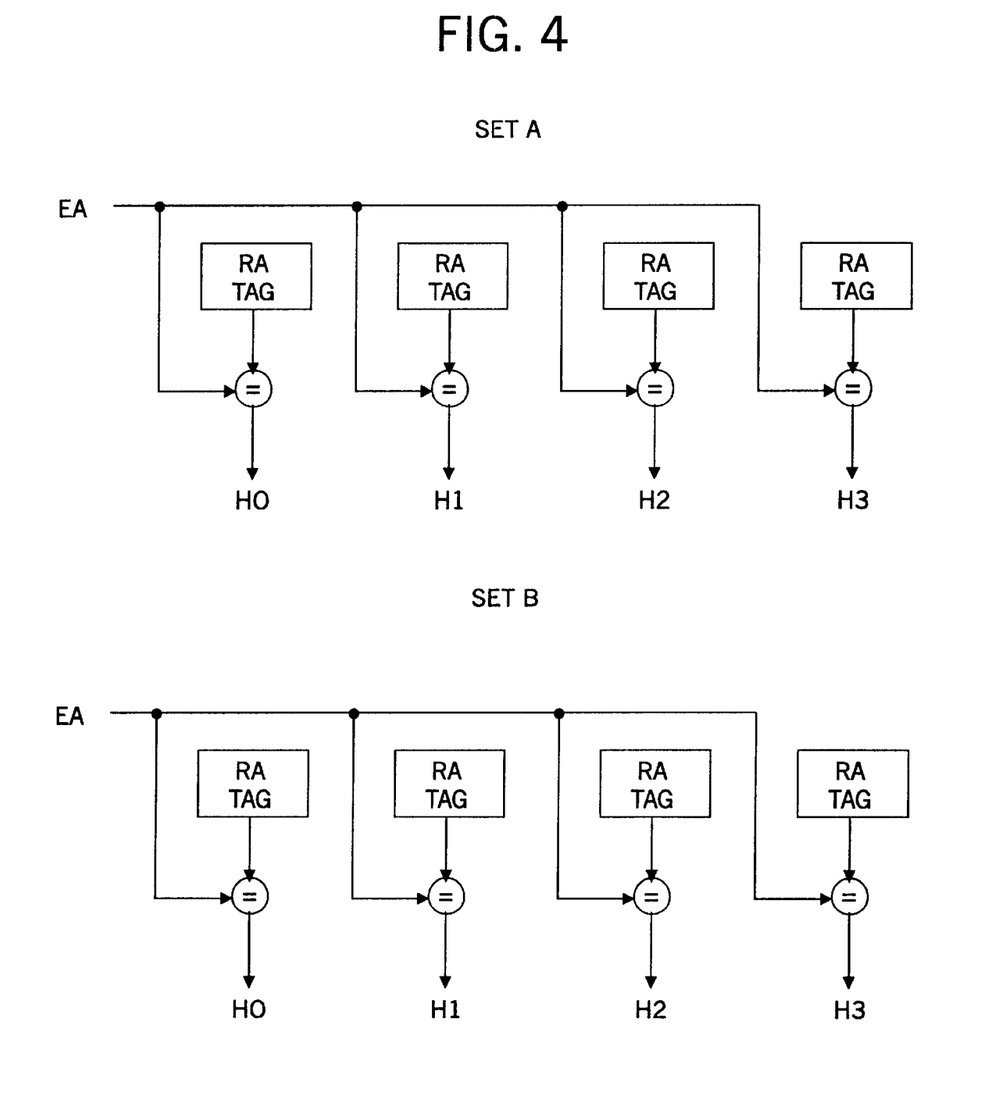
FIG. 4 illustrates separate sets of RA tag arrays.

FIG. 4 illustrates two sets, A and B, of RA tag arrays in a diagram simplified from the one illustrated in FIG. 3 so as to show how an Effective Address (EA) is compared with addresses in each of the RA tag arrays within a set by a comparator (shown as a circle with an equal sign) to produce, in this example, four "hit" bits H0, H1, H2, and H3. FIG. 4 illustrates that a similar architecture is set up for each set of RA tag arrays by illustrating sets A and B.

Under normal, error-free operation of the RA tag arrays, the n-bit hit fields H0 . . . H3 for each set will only have a single asserted bit. In other words, only one of hit signals H0, H1, H2, and H3 will be a 1, while the others will each have a value of 0. Under the present invention as described hereinafter, if more than one of the hit bits, H0 . . . H3, are asserted, then there is some type of failure that has occurred within the RA tag array. Similarly, if there is an asserted bit within the hit fields emanating from both of sets A and B, then that also indicates that there has been some type of failure within the RA tag array.

Figure 5:
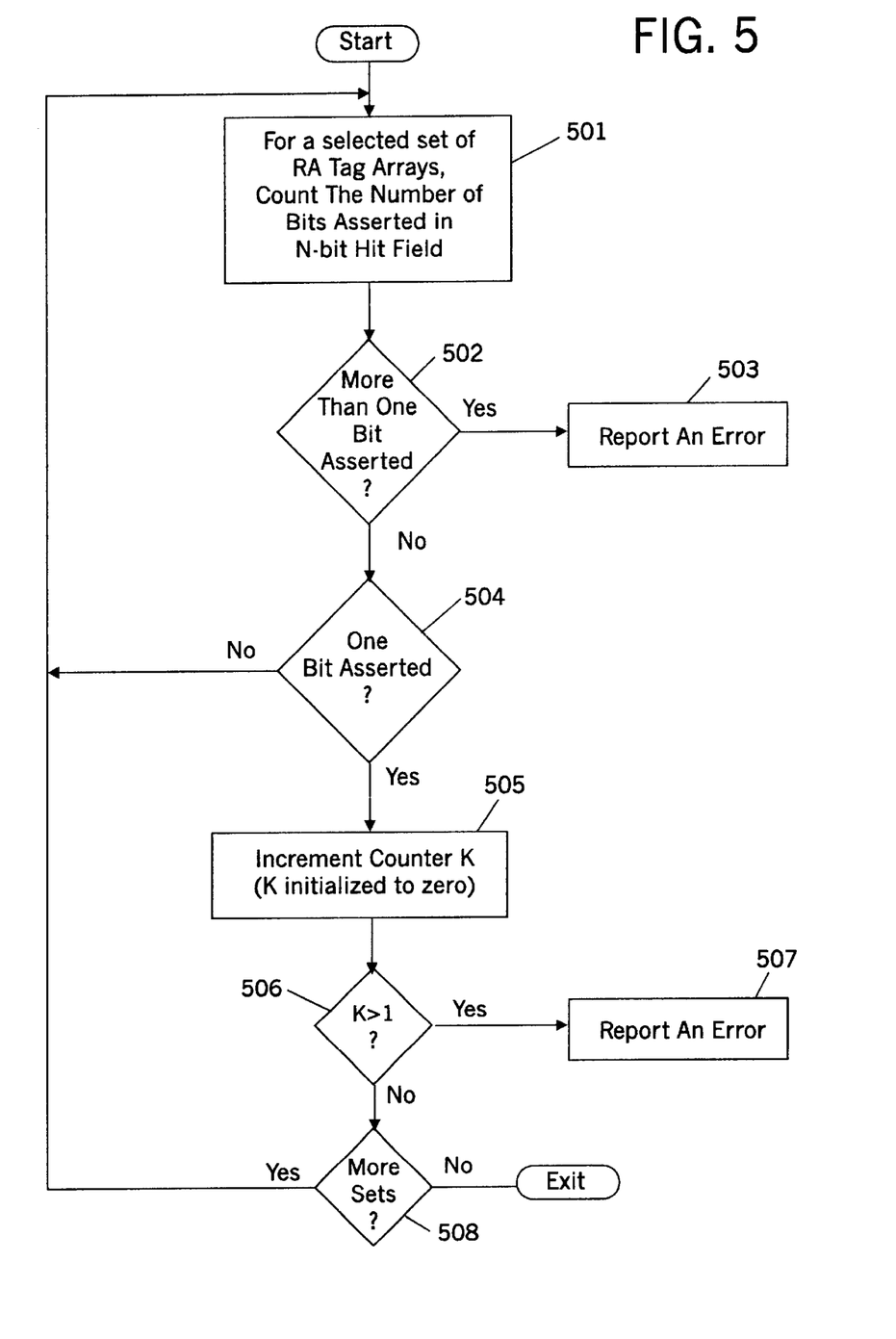
FIG. 5 illustrates a process for implementing the present invention.

Referring to FIG. 5, this process for determining if there has been a failure in the RA tag array begins at step 501, wherein for a selected set of RA tag arrays, the number of bits asserted within the n-bit hit field are counted. In step 502, if more than one bit emanating from that selected set is asserted, then in step 503 an Error is reported. If there is 0 or 1 bit asserted within the n-bit hit field, then the process proceeds to step 504 to determine if only one bit within the hit field has been asserted. If not, then the process returns to step 501 to proceed to the next set of RA tag arrays, which in the example illustrated in FIG. 4 would be set B. If in step 504, only one bit is asserted within the hit field, then the process proceeds to step 505 to increment a counter K (counter K was initialized to zero previous to the process being implemented within FIG. 5). Thereafter, in step 506, a determination is made whether or not K is greater than 1, which would indicate that a bit has been asserted in the hit field emanating from more than one of the sets of RA tag arrays. As a result, an Error would be reported in step 507. If K is not greater than one, then the process proceeds to step 508 to determine if there are still more sets of RA tag arrays to test. If yes, the process returns to step 501. If not, the process exits.

Although the present invention and its advantages have been described in detail, it should be understood that various changes, substitutions and alterations can be made herein without departing from the spirit and scope of the invention as defined by the appended claims.

What is claimed is:

1. A processor comprising a load/store unit having a primary cache and adaptable for coupling to a memory subsystem, the load/store unit further comprising:

a first set of real address tag arrays operable for correcting effective address aliasing within the load/store unit;

first comparators for comparing a received real address to real addresses in each of the real address tag arrays in the first set;

first circuitry for determining if there is a hit in each of the real address tag arrays in the first set as a result of the comparing of the received real address to the real addresses in each of the real address tag arrays in the first set; and first circuitry for reporting an error in circuitry associated with the first set of real address tag arrays if the first determining circuitry outputs more than one hit signal.

2. The processor as recited in claim 1, wherein the circuitry associated with the first set of real address tag arrays includes the real address tag arrays and circuitry for controlling the first set of real address tag arrays.

3. The processor as recited in claim 1, further comprising:
a second set of real address tag arrays operable for correcting effective address aliasing within the load/store unit;
second comparators for comparing the received real address to real addresses in each of the real address tag arrays in the second set;
second circuitry for determining if there is a hit in each of the real address tag arrays in the second set as a result of the comparing of the received real address to the real addresses in each of the real address tag arrays in the second set; and
second circuitry for reporting an error in circuitry associated with the second set of real address tag arrays if the second determining circuitry outputs more than one hit signal.

4. The processor as recited in claim 3, further comprising:
third circuitry for reporting an error in circuitry associated with either or both of the first and second sets of real address tag arrays if both the first and second determining circuitries output a hit signal.

5. The processor as recited in claim 4, wherein the circuitry associated with the first and second set of real address tag arrays includes the real address tag arrays and circuitry for controlling the first set of real address tag arrays.

6. A method for discovering errors in a load/store unit comprising the steps of:
comparing a received real address to real addresses in each of a first set of real address tag arrays;
determining if there is a hit in each of the real address tag arrays in the first set as a result of the comparing of the received real address to the real addresses in each of the real address tag arrays in the first set; and
reporting an error in circuitry associated with the first set of real address tag arrays if the determining step outputs more than one hit signal.

7. The method as recited in claim 6, wherein the circuitry associated with the first set of real address tag arrays includes the real address tag arrays and circuitry for controlling the first set of real address tag arrays.

8. The method as recited in claim 6, further comprising the steps of:
comparing the received real address to real addresses in each of a second set of real address tag arrays;
determining if there is a hit in each of the real address tag arrays in the second set as a result of the comparing of the received real address to the real addresses in each of the real address tag arrays in the second set; and
reporting an error in circuitry associated with the second set of real address tag arrays if the determining step outputs more than one hit signal.

9. The method as recited in claim 8, further comprising the step of:
reporting an error in circuitry associated with either or both of the first and second sets of real address tag arrays if both of the determining steps output a hit signal.

10. The method as recited in claim 9, wherein the circuitry associated with the first and second set of real address tag arrays includes the real address tag arrays and circuitry for controlling the first set of real address tag arrays.

11. A load/store unit having a primary cache and adaptable for coupling to a memory subsystem, the load/store unit further comprising:
a first set of real address tag arrays operable for correcting effective address aliasing within the load/store unit;
first comparators for comparing a received real address to real addresses in each of the real address tag arrays in the first set;
first circuitry for determining if there is a hit in each of the real address tag arrays in the first set as a result of the comparing of the received real address to the real addresses in each of the real address tag arrays in the first set; and
first circuitry for reporting an error in circuitry associated with the first set of real address tag arrays if the first determining circuitry outputs more than one hit signal.

12. The load/store unit as recited in claim 11, wherein the circuitry associated with the first set of real address tag arrays includes the real address tag arrays and circuitry for controlling the first set of real address tag arrays.

13. The load/store unit as recited in claim 12, further comprising:
a second set of real address tag arrays operable for correcting effective address aliasing within the load/store unit;
second comparators for comparing the received real address to real addresses in each of the real address tag arrays in the second set;
second circuitry for determining if there is a hit in each of the real address tag arrays in the second set as a result of the comparing of the received real address to the real addresses in each of the real address tag arrays in the second set; and
second circuitry for reporting an error in circuitry associated with the second set of real address tag arrays if the second determining circuitry outputs more than one hit signal.

14. The load/store unit as recited in claim 13, further comprising:
third circuitry for reporting an error in circuitry associated with either or both of the first and second sets of real address tag arrays if both the first and second determining circuitries output a hit signal.

15. The load/store unit as recited in claim 14, wherein the circuitry associated with the first and second set of real address tag arrays includes the real address tag arrays and circuitry for controlling the first set of real address tag arrays.

* * * * *

UNITED STATES PATENT AND TRADEMARK OFFICE
CERTIFICATE OF CORRECTION

PATENT NO. : 6,640,293 B1
DATED : October 28, 2003
INVENTOR(S) : Jose Angel Paredes et al.

It is certified that error appears in the above-identified patent and that said Letters Patent is hereby corrected as shown below:

<u>Column 3,</u>
Line 1, please delete "on".
Line 3, please replace "member" with -- number --.
Line 21, following "together" please insert -- , --.

Signed and Sealed this

Twenty-second Day of June, 2004

JON W. DUDAS
*Acting Director of the United States Patent and Trademark Office*